US011257365B2

(12) United States Patent
Van Laethem et al.

(10) Patent No.: US 11,257,365 B2
(45) Date of Patent: Feb. 22, 2022

(54) DEVICE AND METHOD FOR AUTOMATICALLY UPDATING A DATABASE OF DRIVING SPEED LIMITS

(71) Applicant: COYOTE SYSTEM, Suresnes (FR)

(72) Inventors: Jean-Marc Van Laethem, Rully Bray (FR); Fabien Pierlot, Paris (FR)

(73) Assignee: COYOTE SYSTEM SAS, Suresnes (FR)

( * ) Notice: Subject to any disclaimer, the term of this patent is extended or adjusted under 35 U.S.C. 154(b) by 0 days.

(21) Appl. No.: 16/543,960

(22) Filed: Aug. 19, 2019

(65) Prior Publication Data

US 2020/0035095 A1 Jan. 30, 2020

Related U.S. Application Data

(62) Division of application No. 14/910,468, filed as application No. PCT/FR2014/051971 on Jul. 30, 2014, now Pat. No. 10,431,078.

(30) Foreign Application Priority Data

Aug. 7, 2013 (FR) ..................................... 13/01897

(51) Int. Cl.

*G08G 1/052* (2006.01)
*G08G 1/01* (2006.01)
*G01C 21/32* (2006.01)

(52) U.S. Cl.

CPC ............. *G08G 1/052* (2013.01); *G01C 21/32* (2013.01); *G08G 1/0112* (2013.01); *G08G 1/0133* (2013.01)

(58) Field of Classification Search

CPC .... G08G 1/052; G08G 1/0112; G08G 1/0133; G01C 21/32

See application file for complete search history.

(56) References Cited

U.S. PATENT DOCUMENTS 7,821,421 B2 * 10/2010 Tamir .................... G06Q 40/08 340/901
2008/0071465 A1 3/2008 Chapman et al.
(Continued)

FOREIGN PATENT DOCUMENTS

DE 10 2007 031329 A1 1/2009
DE 10 2009 045761 A1 4/2010
(Continued)

OTHER PUBLICATIONS

International Search Report for PCT/FR2014/051971 dated Oct. 2, 2014.
(Continued)

*Primary Examiner* — Mohamed Barakat
(74) *Attorney, Agent, or Firm* — Sughrue Mion, PLLC

(57) ABSTRACT

A system and method for updating a database of authorized traffic speed limits ($V_{Lt}$) for vehicles on at least one section ($t_n$) concerned of a road network, including a remote server and an on-board system in each vehicle. A system and method capable of constituting a database of the average traffic speeds of vehicles on the sections with a view to implementing the aforementioned system.

6 Claims, 6 Drawing Sheets

(56) References Cited

U.S. PATENT DOCUMENTS

Figure 1:
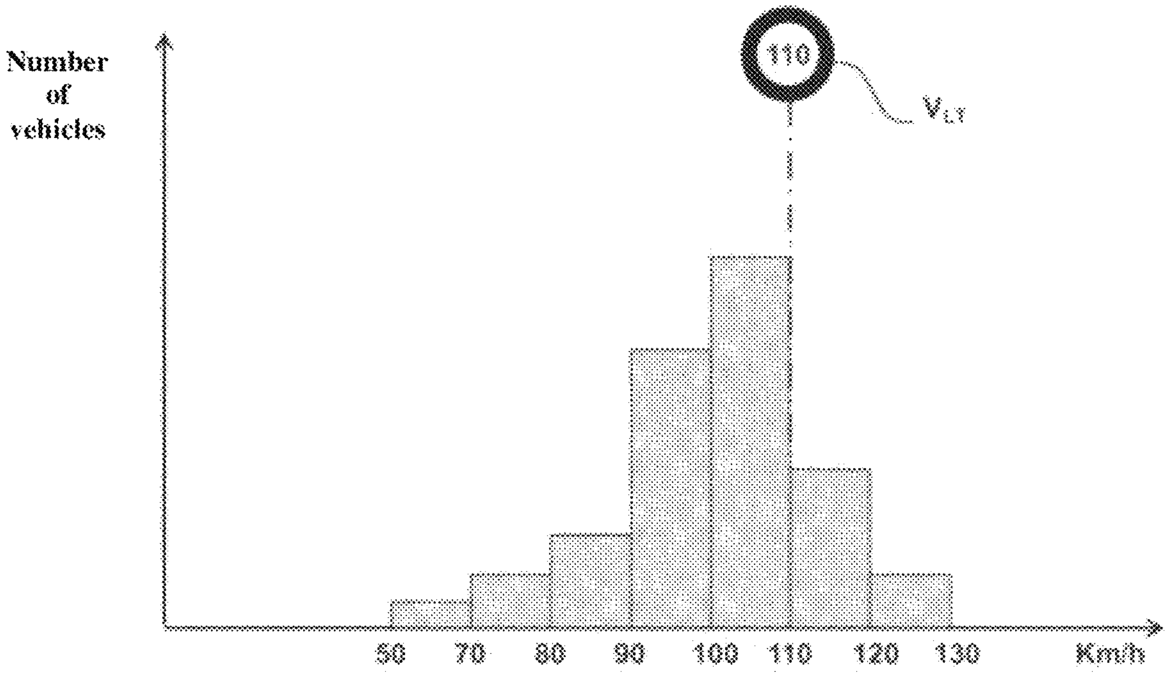

| | | | |
|---|---|---|---|
| 2008/0071467 A1 | 3/2008 | Johnson et al. | |
| 2011/0160988 A1* | 6/2011 | Rogers | G08G 1/20 701/119 |
| 2013/0245943 A1 | 9/2013 | Hiestermann et al. | |
| 2013/0317730 A1 | 11/2013 | Van Laethem et al. | |
| 2015/0088335 A1 | 3/2015 | Lambert et al. | |
| 2016/0144713 A1 | 5/2016 | Verheijen et al. | |
| 2016/0379489 A1 | 12/2016 | MacFarlane | |
| 2018/0158332 A1* | 6/2018 | Jang | G08G 1/0129 |
| 2019/0279502 A1* | 9/2019 | Fowe | G08G 1/0141 |

FOREIGN PATENT DOCUMENTS

| | | | |
|---|---|---|---|
| DE | 102009045761 A1 * | 4/2010 | G08G 1/096775 |
| EP | 2 341 493 A1 | 7/2011 | |
| FR | 2 963 149 A1 | 1/2012 | |
| WO | 2009/059766 A1 | 5/2009 | |
| WO | 2009/068970 A1 | 6/2009 | |
| WO | 2010/081837 A1 | 7/2010 | |
| WO | 2010/105713 A1 | 9/2010 | |

OTHER PUBLICATIONS

Ulrich et al. (DE 10 2009 045 761 A1), Apr. 22, 2010, Machine Translation (Year: 2010).

* cited by examiner

DEVICE AND METHOD FOR AUTOMATICALLY UPDATING A DATABASE OF DRIVING SPEED LIMITS

CROSS REFERENCE TO RELATED APPLICATIONS

This application is a divisional of U.S. application Ser. No. 14/910,468, filed on Apr. 1, 2016, which is a National Stage of International Application No. PCT/FR2014/051971 filed Jul. 30, 2014, claiming priority based on French Patent Application No. 1301897 filed Aug. 7, 2013, the contents of all of which are incorporated herein by reference in their entirety.

The present invention relates to a device or system and a method intended for updating, completely automatically, a database of authorized traffic speed limits on all sections of a road network. It also relates to the automatic constitution of a database of average traffic speeds of vehicles on said sections with a view to implementing the aforementioned method.

It is known that currently, it is of interest for many road traffic management systems to be able to have databases of authorized traffic speed limits on a road network that are continuously updated.

Such updating is currently carried out by mapping companies that acquire the data by means of vehicles equipped with cameras that travel the road network, section by section, in order to record "in situ" the speed limits displayed on traffic signs.

Said recordings are then displayed and encoded in appropriate databases by specialized offices. The result is that this type of operation is particularly expensive, and under these conditions, only the main roads are monitored and updated regularly, while the secondary roads are only updated irregularly, which results in a lack of reliability of the database because it includes some data that are obsolete and therefore erroneous.

The present invention is proposed in order to remedy this disadvantage by proposing a system that enables a database of traffic speed limits on said sections to be updated completely automatically.

Thus, an object of the present invention is a system for updating a database of authorized traffic speed limits of vehicles on at least one section concerned of a road network, including a remote server comprising said speed limits database, an average speeds database, means of communicating with an on-board system on each vehicle, said on-board system comprising:

map reference means, particularly of the GPS type,
means of communicating with the remote server,
means of measuring the instantaneous speed of the vehicle,
data processing means, the on-board system and/or the remote server including a mapping database of road sections, characterized in that it comprises means capable of:

periodically calculating, for said section concerned, the statistical maximum value of the average speed values of all vehicles having traversed said section concerned during a specific period of time, which are stored in the average speeds database,
determining the difference between said statistical maximum value and the value recorded for said section in the speed limits database,
if the difference is greater than a threshold value, replacing in the aforementioned speed limits database the aforementioned value recorded for said section with a new value based on the statistical maximum value.

According to the invention, the remote server will be able to include means capable of taking, as a new value, the value closest to the statistical maximum value contained in a table of possible limit values.

The threshold value may be a percentage of the speed limit value recorded in the speed limits database.

Moreover, the map reference means of a vehicle may be capable of furnishing the heading thereof, and the direction of travel of the vehicle may be deduced therefrom.

In one implementation of the invention, the on-board system may include a speed limits database, the data of which will be updated as a function of the data contained in the speed limits database of the server. The on-board system may include means of displaying the speed limit on the section concerned, provided by its speed limits database.

An object of the present invention is also a method of updating a speed limits database for vehicle traffic on at least one section concerned of a road network, including a remote server comprising said speed limits database, an average speeds database, means of communicating with an on-board system on each vehicle, said on-board system comprising:

map reference means, particularly of the GPS type,
means of communicating with the remote server,
means of measuring the instantaneous speed of the vehicle,
data processing means, the on-board system and/or the remote server including a mapping database of the road sections, characterized in that the remote server:

periodically calculates, for said section concerned, the statistical maximum value of the average speed values of all vehicles having traversed said section concerned during a specific period of time and which are stored in the average speeds database,
determines the difference between said statistical maximum value and the value recorded for said section in the speed limits database,
if the difference is greater than a threshold value, it replaces in the aforementioned speed limits database the aforementioned value recorded for said section with a new value based on said statistical maximum value.

According to the invention, the value closest to the statistical maximum value contained in a table of possible limit values can be taken as the new speed limit value for said section. Moreover, the new value of the authorized speed limit may be displayed in the on-board system.

Furthermore, it is known that it is of interest for road network managers to have a database in which the average speeds of vehicles traveling on the respective different sections of road comprising a road network would be stored. Such a database is of particular interest for establishing, according to the invention, an update of the authorized traffic speed limits databases on the sections of a road network, as previously explained.

An object of the present invention is also a system of constituting a database of average traffic speeds of vehicles on at least one section concerned of a road network intended for the implementation of a system for updating a speed limits database, as previously explained, characterized in that the on-board system of each vehicle includes means capable of:

determining, based on its map reference means and on the mapping database, the section concerned on which it is traveling as well as each change of section, at each change of section, sending to the remote server the identification of the last section traveled and:

either calculating the average speed of the vehicle on said last section and communicating said speed to the remote server, or communicating to the remote server the times the vehicle entered and exited the last section, the remote server being in this case provided with means capable of calculating the average speed of the vehicle on said section, the remote server comprising means capable of placing in an average speeds database at least the identifier of the section concerned as well as said average speed value on said section, the travel time of the vehicle over said section as well as the direction of travel thereon.

According to the invention, the mapping database may comprise the following data:

identifier of the road section, map reference of each section change node.

Moreover, the map reference means may be capable of furnishing the position, instantaneous speed and heading of the vehicle.

In one implementation of the invention:

the map reference means may be capable of reading, at specific time intervals, the successive instantaneous speeds of the vehicle, the on-board system may comprise means of storing said instantaneous speeds, the on-board system may comprise means of calculating the average of said instantaneous speeds.

In another implementation of the invention:

the map reference means may be capable of reading, at specific time intervals, the successive instantaneous positions of the vehicle, the on-board system may comprise means of storing said instantaneous positions, the on-board system may comprise means of calculating the length of the section concerned, which is equal to the sum of the lengths of the segments separating two successive readings of the section concerned, the on-board system may comprise means of calculating the travel time over the section concerned, which is equal to the time separating the first and the last readings on said section, the on-board system may comprise means of calculating the average speed of the vehicle on the section concerned, which is equal to the ratio of the length of the section divided by the time traveled thereon.

An object of the present invention is also a method of updating a speed limits database for vehicle traffic on at least one section concerned of a road network, including a remote server comprising said speed limits database, an average speeds database, means of communicating (15) with an on-board system on each vehicle, said on-board system comprising:

map reference means, particularly of the GPS type, means of communicating with the remote server, means of measuring the instantaneous speed of the vehicle, data processing means, the on-board system and/or the remote server comprising a mapping database of the road sections, characterized in that the remote server:

periodically calculates, for said section concerned, the statistical maximum value of the average speed values of all vehicles having traversed said section concerned during a specific period of time and which are stored in the average speeds database, determines the difference between said statistical maximum value and the value recorded for said section in the speed limits database, if the difference is greater than a threshold value, it replaces in the aforementioned speed limits database the aforementioned value recorded for said section with a new value based on said statistical maximum value.

According to the invention, the value closest to the statistical maximum value contained in a table of possible limit values can be taken as a new speed limit value for said section. The new value of the authorized speed limit can also be displayed in the on-board system.

An object of the present invention is also a method of constituting a database of average traffic speeds for vehicles on at least one section concerned of a road network for the implementation of a method of updating a speed limits database, as previously explained, said average speeds database being contained in a remote server comprising means of communicating with an on-board system on each vehicle, said on-board system comprising:

map reference means, particularly of the GPS type, means of communicating with the remote server, means of measuring the instantaneous speed of the vehicle, data processing means, the on-board system and/or the remote server comprising a mapping database of the road sections, characterized in that the on-board system of the vehicle:

determines, based on its map reference means and on the mapping database, the section concerned on which it is traveling as well as each change of section, determines at each change of section the average speed of the vehicle on the section previously traveled, and communicates said speed to the remote server as well as the identifier of said section and the direction of travel of the vehicle thereon, and the remote server, upon receipt of said communication, places in the average speeds database the identifier of the section concerned, said average speed value on said section, the travel time over said section as well as the direction of travel thereon.

In one implementation of the invention for calculating the average speed of the vehicle, the on-board system:

will read, at specific time intervals, the successive instantaneous positions of the vehicle, will store said instantaneous positions in memory, will calculate the length of the section concerned, which is equal to the sum of the lengths of the segments separating two readings of successive positions of the section concerned, will calculate the time traveled on the section concerned, which is equal to the time separating the first and the last readings on said section, will calculate the ratio of the length of the section divided by the time traveled thereon.

In another implementation of the invention, in order to calculate the average speed of the vehicle, the on-board system:

will read, at specific time intervals, the successive instantaneous speeds of the vehicle, will store said instantaneous speeds in memory, will calculate the average of said speeds.

Figure 2:
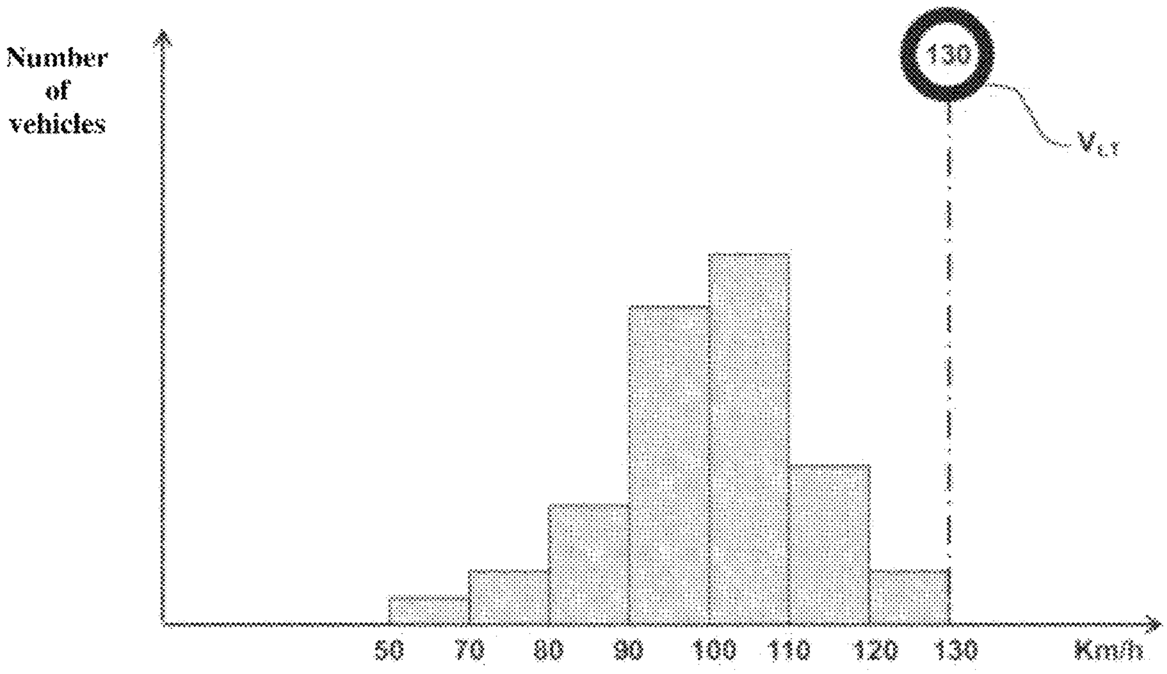
Figure 3:
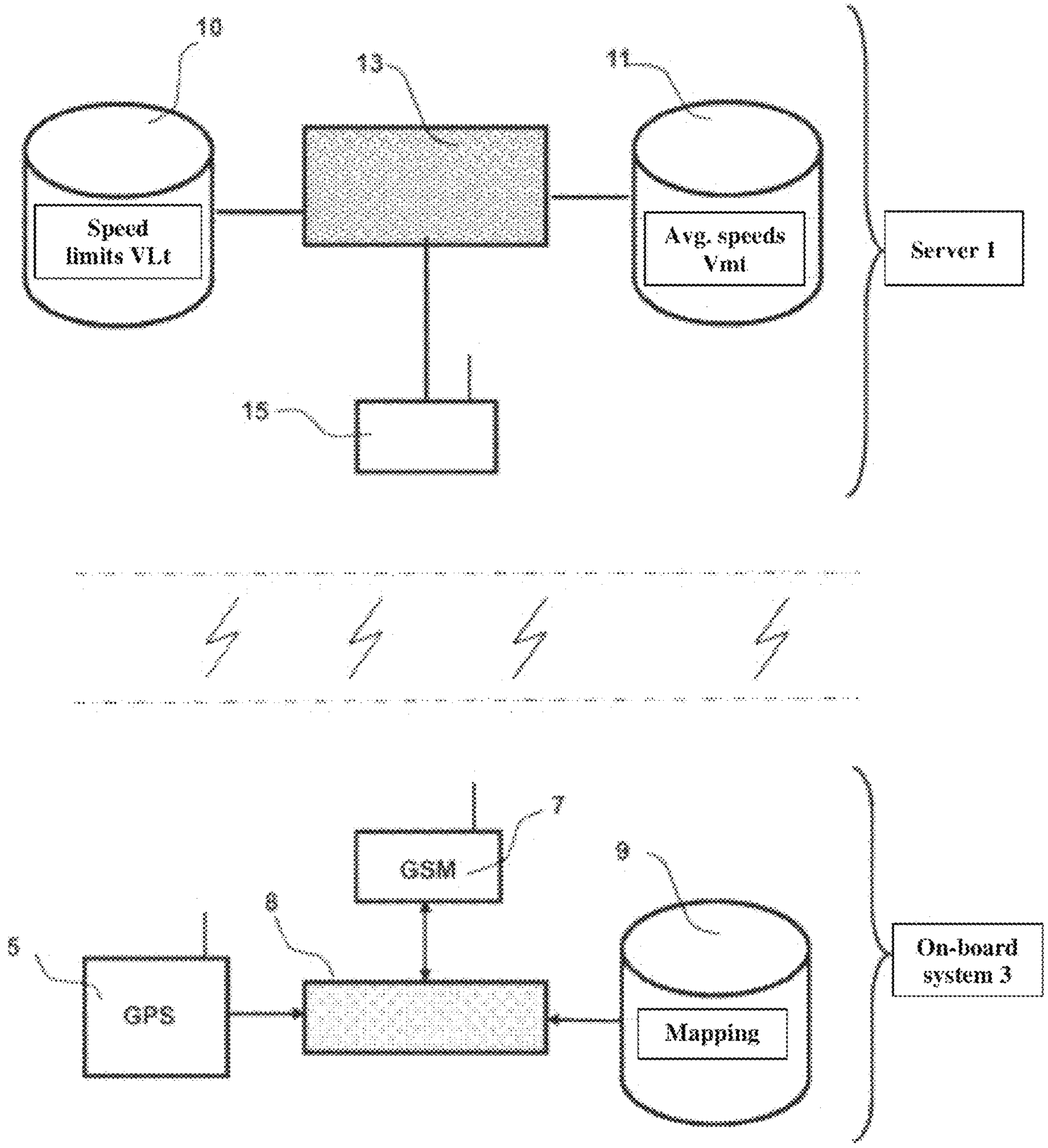
Figure 4A:
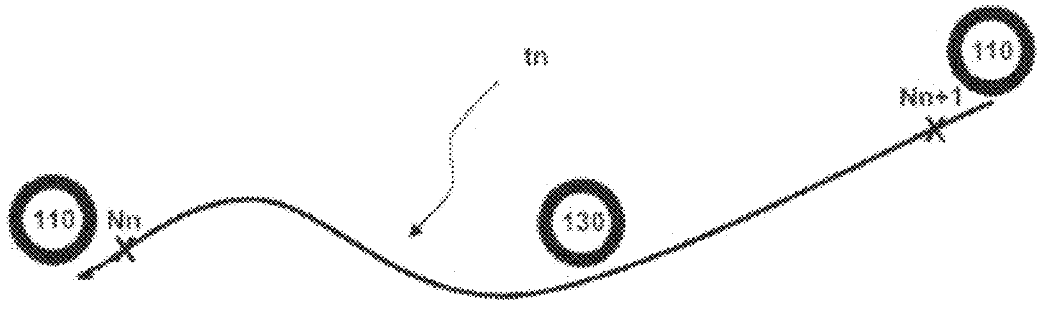
Figure 5:
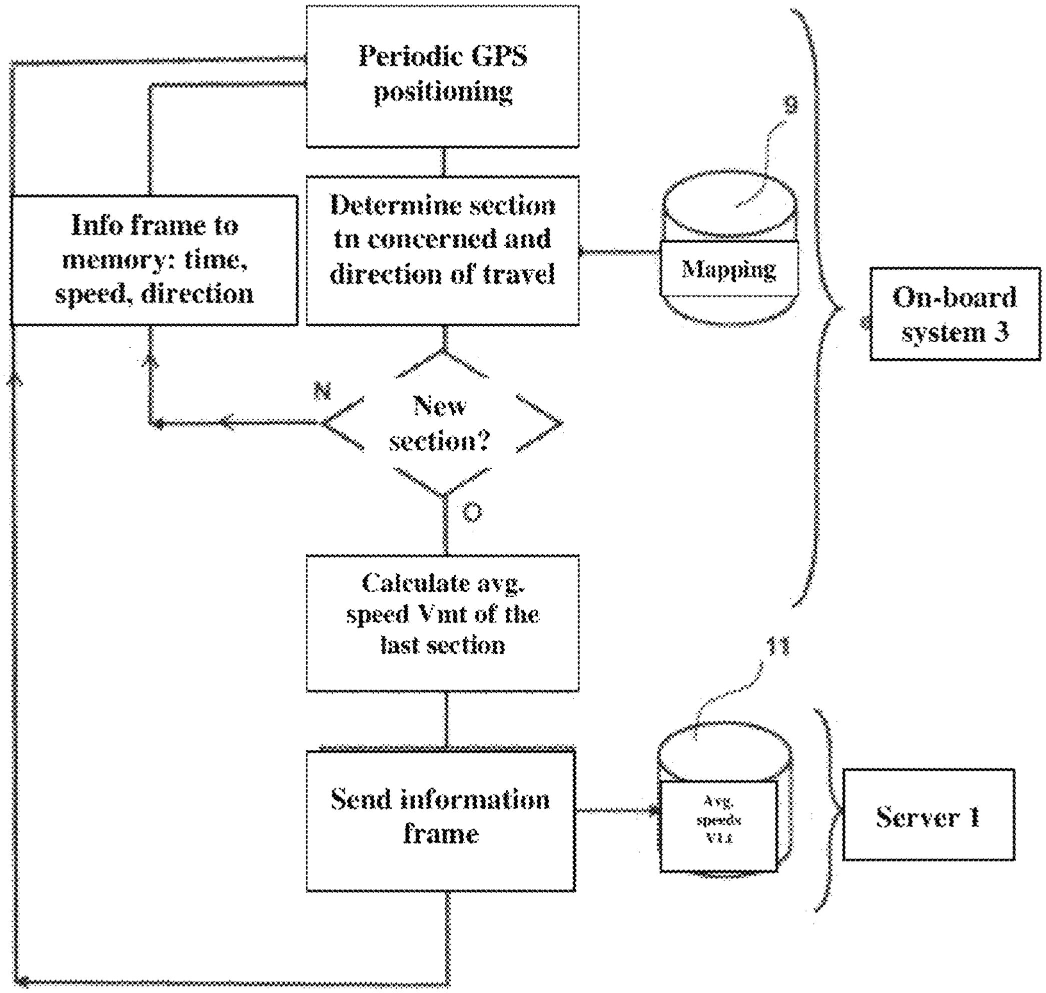
Figure 4B:
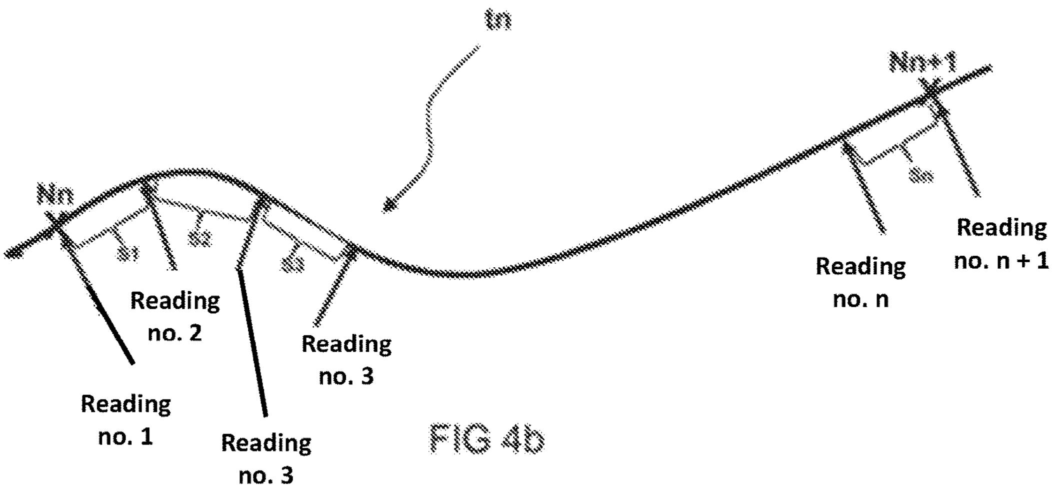
Figure 6:
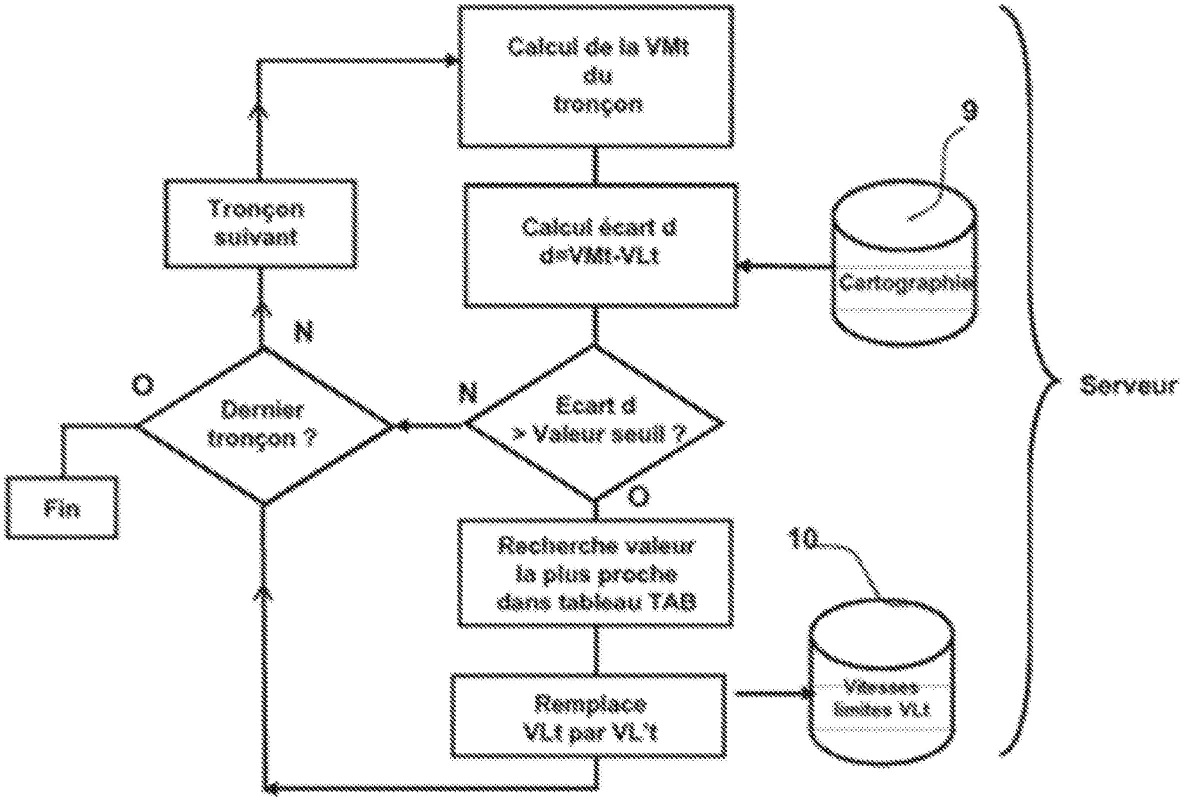
Figure 7:
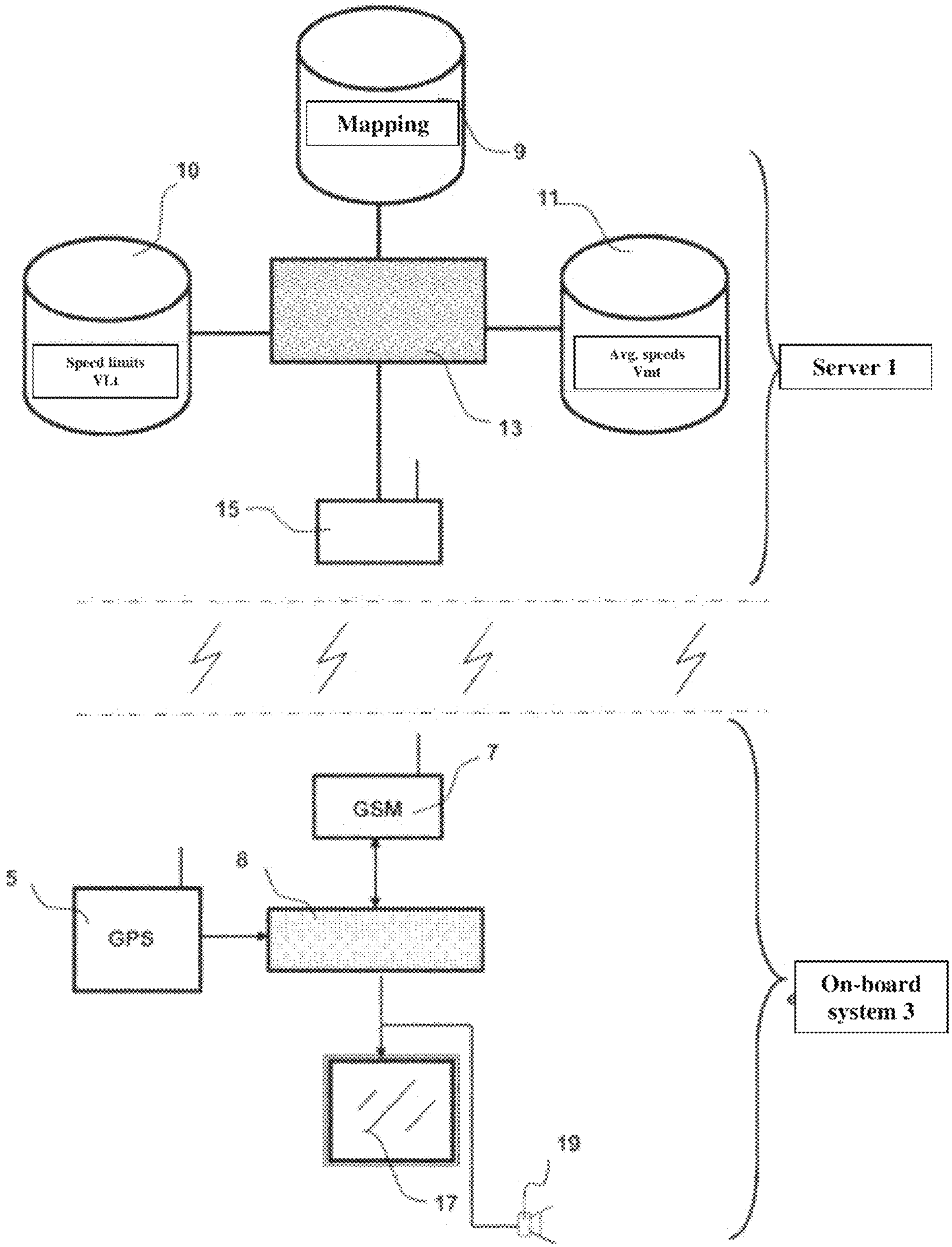
Figure 8A:
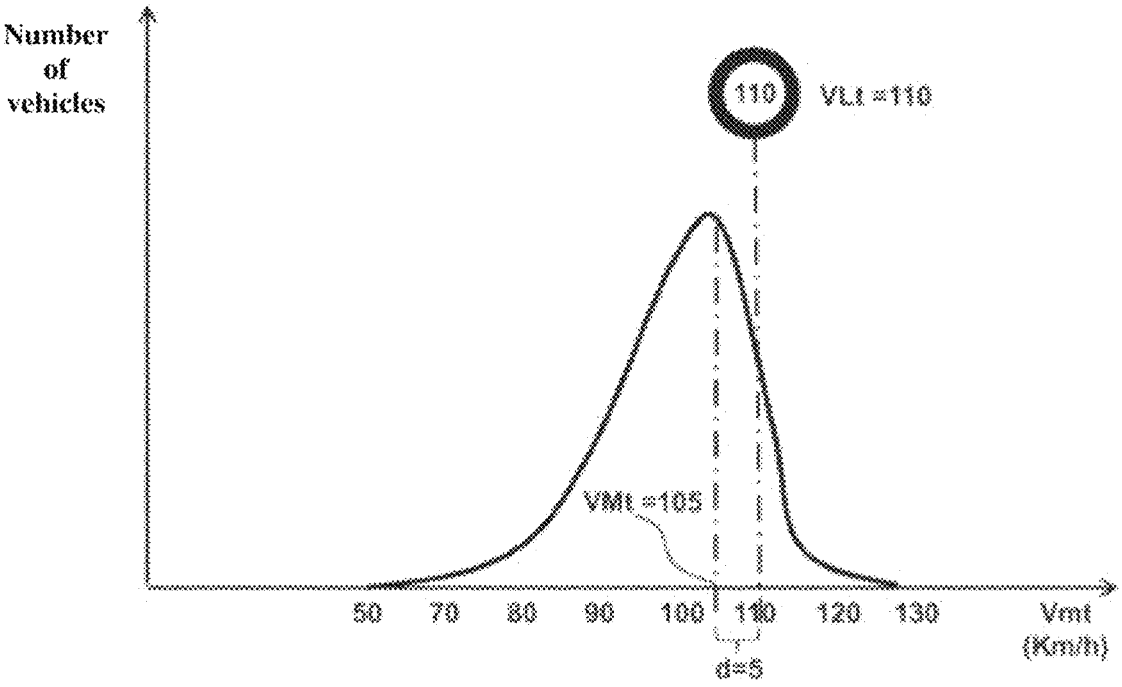
Figure 8B:
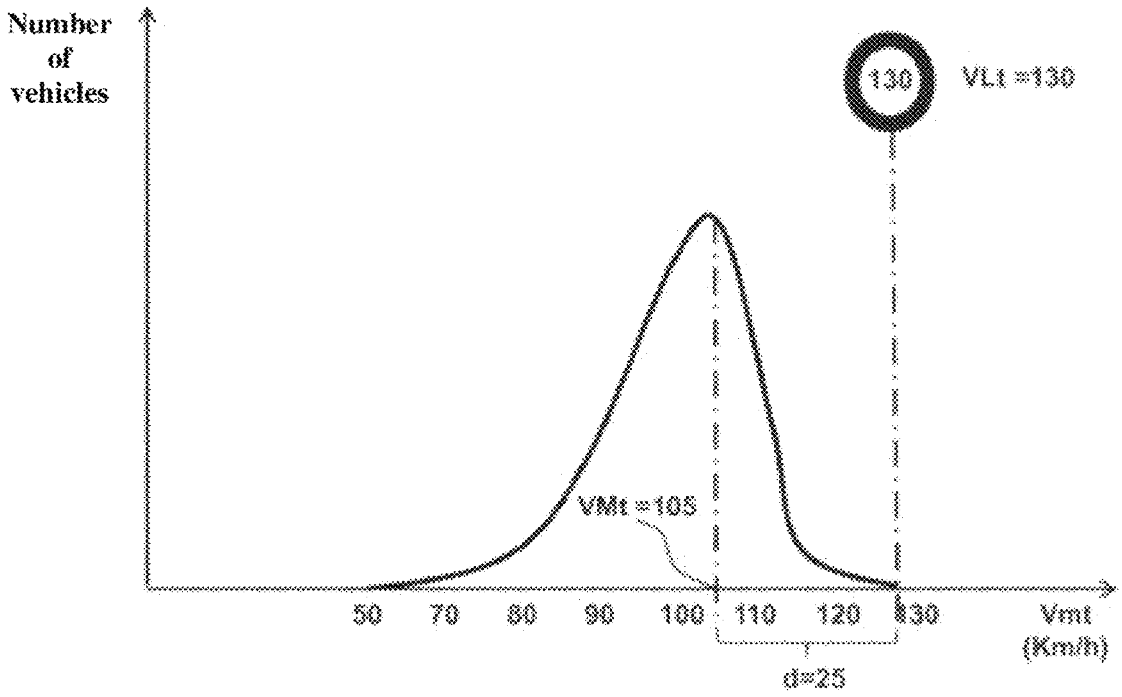

Described below, by way of non-limiting example, is one form of implementation of the present invention, with reference to the appended drawings in which:

FIG. 1 is a histogram of the average speeds of a set of vehicles having traversed the same road section, for which the speed limit displayed thereon is equal to the one recorded in the database, FIG. 2 is a histogram of the average speeds of a set of vehicles having traversed the same road section for which the speed limit displayed thereon is lower than the one recorded in the database, FIG. 3 is a schematic view of a system making it possible to establish, firstly, a database of average speeds of vehicles traveling on road sections, and secondly, an updating of the speed limits database on said sections, FIG. 4*a* is a schematic view of a road section extending between two section nodes, FIG. 4*b* is a schematic view of said road section showing the positions of the different readings made thereon by the system according to the invention, FIG. 5 is a flowchart representing the different steps implemented according to the invention for establishing an average speeds database for vehicles traveling on road sections, FIG. 6 is a flowchart representing the different steps implemented according to the invention for updating a database of authorized speed limits of vehicles traveling on road sections, FIG. 7 is a schematic view of a variant of implementation of the system represented in FIG. 3, FIGS. 8*a* and 8*b* are diagrams showing the number of vehicles having traversed a specific section as a function of the average speed of travel of said vehicles on said section, respectively when the value stored in the speed limits database is correct and when said value is greater than the value displayed on the signs of the road section concerned.

The present invention begins with the observation that currently, more and more countries have installed automated means of monitoring speeds of vehicles. Consequently, it can be acknowledged that statistically, most drivers comply with these speed limits, and in practice, they also adjust their speed slightly below the value of the speed limit displayed on road signs.

By way of example, a histogram was produced showing the distribution of speeds of vehicles traversing a section of highway on which the authorized speed limit $V_{Lt}$ is set at 110 km/h and which is represented in FIG. 1. The speeds of the vehicles are shown on the abscissa in the histogram, and the number of vehicles traveling at said speeds on the ordinate. Thus, it can be seen that there are twice as many vehicles traveling below the authorized speed limit $V_{Lt}$, i.e., between 100 and 110 km/h, than vehicles traveling above said speed limit, i.e., between 110 and 120 km/h.

Thus, discounting the impact of disturbing phenomena such as traffic jams or any other cause of traffic congestion, the speed respected by drivers corresponds to the upper limit of the interval of the distribution of average speeds of vehicles traveling on the same road section.

Moreover, represented in FIG. 2 is a histogram of speeds obtained on a road section for which the authorized speed limit $V_{Lt}$ is recorded in the database as 130 km/h. It can be seen in this histogram that the peak of vehicle speeds is no longer situated just below the speed considered as the speed limit $V_{Lt}$, i.e., 130 km/h, on said section, as was the case in FIG. 1, but rather well above said limit, i.e., a speed of between 100 and 110 km/h. It will be acknowledged, then, that on said section $\underline{t}$, automobile drivers statistically respect a lower speed limit than the one indicated on the road signs, which is 110 km/h.

As represented in FIG. 3, the system according to the invention essentially utilizes a remote server 1 and the automotive vehicles of the users, which are equipped with an on-board system 3 that comprises global positioning means 5, particularly of the GPS type, as well as communication means 7 capable of communicating said GPS means with the remote server, particularly by a GPRS or 3G-type network. It further comprises a "mapping database" 9, which contains the map of the road network and which enables vehicles equipped with the on-board system 3, in combination with the positioning coordinates furnished by the global positioning means 5, to be located on a map. Said complex is managed by a microprocessor 8. Furthermore, it is known that the different routes of the road network are divided into sections $\underline{t}$, each of which represents, as previously specified, an interval for which the value of the authorized speed limit $V_{Lt}$ is the same. Said different sections are referenced by a unique identifier $t_1, t_2, \ldots t_n$.

In one implementation of the invention, a schematic diagram of which is shown in FIG. 4*a*, the mapping database 9 comprises, for each of the sections $\underline{t}$ forming the road network, its identifier $t_1, t_2, \ldots, t_n$, the direction of travel, and for each of said sections, the global positioning coordinates, particularly in latitude and longitude, at least two ends $N_n$ and $N_{n+1}$ of said sections (hereinafter called section nodes), which represent each of the points separating two sections for which the authorized speed limit $V_{Lt}$ is different, or in other words, the points where said speed limit changes.

By way of example, represented in FIG. 4*a* is a highway section $\underline{t}_n$ that begins at a section node $N_n$ where the authorized speed limit changes from a value of 110 km/h to a value of 130 km/h and which ends at the next section node $N_{n+1}$ where the speed limit returns from 130 km/h to 110 km/h for a vehicle that moves from the node $N_n$ towards the node $N_{n+1}$.

The remote server 1 includes a plurality of databases, namely in particular a "speed limits database" 10, which contains the value of the authorized speed limit $V_{Lt}$ of each section of the road network, as well as an "average speeds database" 11 intended to receive the values of the average speeds $V_{mt}$ per section that are read during the process according to the invention.

As represented in FIG. 3, said databases are managed by a processor 13, which also manages the remote communication means 15 intended to ensure communication of the server 1 with the users' vehicles equipped with the on-board system 3.

According to the invention, and as represented in the flowchart of FIG. 5, the global positioning system 5 of the on-board system 3 of each of the vehicles in motion, and under the management of the microprocessor 8, periodically reads, for example with a frequency of $\underline{p}$ equal to one second, its position, and by querying its mapping database 9, it determines the road section concerned $t_n$ and the direction of movement of the vehicle thereon. According to the invention, the on-board system 3 monitors any change of section of the vehicle.

Thus, for each reading, the on-board system 3 detects any change of section, and as long as there is no change of section, it places in memory in the on-board system an information frame containing the time (day, hour, minute, second) of the reading, the value of the instantaneous speed $V_{it}$ on said section, as well as the direction of travel of the vehicle.

As soon as the on-board system 3 detects a change of section, it calculates the average speed $V_{mt}$ of the vehicle during passage through the section that it has just exited.

To accomplish this, for example in a first calculation mode, the on-board system may calculate the average of the various instantaneous speeds $V_{it}$ it has collected in memory by the different readings it has made during its passage through the section.

In a second calculation mode, the on-board system 3 may calculate the average speed $V_{mt}$ of the vehicle by producing the ratio of the length $L_t$ of the section to the time $T_t$ that the vehicle has taken to travel through it, since it knows the time of entry of the vehicle into said section and the time of exiting thereof, and it is also capable of calculating the length of the section $t_n$. To do so, as represented in FIG. 4*b*, in said mode of implementation, the system will note at each reading the position of the vehicle, with the result that it will be able to determine the length $LS_n$ of each of the segments of sections $S_1, S_2, \ldots S_n$, separating two successive readings of frequency p. The average speed $V_{mt}$ will thus be equal to the sum of the length of said n segments of sections over the time traveled (n×p) of said section, or:

$$V_{mt} = \frac{LS_1 + LS_2 + \ldots + LS_n}{n \cdot p}$$

The on-board system 3 then sends to the remote server 1 an information frame containing the value $V_{mt}$ of said average speed, the identification parameter $t_n$ of the section concerned, and the corresponding time (date, time). Upon receipt, said server places said information frame in its database of average speeds 11.

The different vehicles traveling on the different road sections will thus be able to automatically constitute the database of average speeds 11 of all of the sections of a road network.

In one variant of implementation of the present invention, the on-board system 3 can store this information frame in memory and communicate it to the remote server 1 only with a certain frequency that can range from a few minutes to several days.

In one variant of implementation of the present invention, which is represented in FIG. 7, the mapping database 9 is integrated with the server 1. In such a configuration, after the reading of its GPS position, the on-board system 3 contacts the server 1 and queries the mapping database 9 thereof so as to determine the section $t_n$ on which the vehicle is located as well as the location of the next section node $t_n$ through which the vehicle will pass. The process then proceeds as previously explained.

In another variant of implementation of the invention, the mapping database 9 can be located both in the server 1 and in the on-board system 3.

The present invention is of particular interest in that it makes it possible to take a reading completely automatically of the average speeds $V_{mt}$ of vehicles traveling over the different sections of a road network and to constitute a database of said average speeds, which can be used for various applications in the domain of road traffic management.

It is therefore of particular interest in that it enables an automatic update of the traffic speed limits database to be made over all or part of said road network.

Thus, according to the invention, and as represented in the flowchart of FIG. 6, from the database 11 of average speeds $V_{mt}$, the processor 13 of the remote server 1 is capable of constructing, for each of the road sections $t_n$, a graph of the type represented in FIGS. 8*a* and 8*b*, where the abscissa is the average speed $V_{mt}$ of vehicles having traversed said road section $t_n$ during a given period, and the ordinate is the number of vehicles corresponding to said speeds.

Periodically, with a period particularly on the order of one day for example, if the object is to determine if a work zone is in progress, the processor 13 of the remote server 1 determines, for the sections that it wishes to verify, the maximum value $V_{Mt}$ of the average speeds $V_{mt}$ of all vehicles having traversed said section over the course of the given period and which corresponds to the speed at which most vehicles traveled over said section. Said period can be reduced to several minutes of observation if the object is to update a new speed limit on a variable-speed road section and the vehicle flow contributing to the measurement is sufficient.

The system then compares said maximum value $V_{Mt}$ with the value of the authorized speed limit $V_{Lt}$ recorded in the speed limits database 10, and if the difference d is greater than a specific threshold value, for example 10%, it is concluded that the value of the authorized speed limit $V_{Lt}$ on said section $t_n$ appearing in said speed limits database 10 is in error.

Thus, when said graph occurs as seen in FIG. 8*a*, where the value of the authorized speed limit $V_{Lt}$ recorded in the speed limits database 10 is equal to 110 km/h, the processor 13 determines the maximum value $V_{Mt}$ of the graph, i.e., 105 km/h, and then calculates the difference d:

$$d = V_{Mt} - V_{Lt} = 5 \text{ km/h}$$

Since said difference is less than the value of 10% (taken here as threshold value) of the value $V_{Lt}$ of the authorized speed limit recorded for said section, the processor considers that said value is correct and proceeds to the next process as represented in FIG. 6. It verifies whether the section is the last one it wishes to verify, and if not, it proceeds to the next.

However, if the graph appears as in FIG. 8*b*, where the value of the speed limit $V_{Lt}$ recorded in the speed limits database 10 is equal to 130 km/h, the processor 13 determines, as previously, the maximum value $V_{Mt}$ corresponding to the maximum number of vehicles for said speed value, or 105 km/h, and then calculates the difference d.

$$d = V_{Mt} - V_{Lt} = 25 \text{ km/h}$$

Since this difference is greater than 10% of the value of the speed recorded for said section, the processor considers that the recorded value is incorrect.

Under these conditions, it then seeks in a table of possible speed limits TAB the one that is closest to the value $V_{Mt}$, and it is this value that it will use for the modified speed limit value $V_{L't}$. The table TAB may be composed of speed limits in force on the road network, for example: 10, 30, 50, 70, 90, 110 and 130 km/h.

Thus, in the preceding example, the system will use the value of 110 km/h as modified value $V_{L't}$ of the authorized speed limit on said section.

The system then replaces the value $V_{Lt}$ in the speed limits database 10 with the value $V_{L't}$.

The processor 13 of the remote server 1 proceeds in the same way for all or part of the other sections $t_n$ of the road network.

In a variant of implementation of the present invention, the on-board system 3 includes, as represented in FIG. 7, in addition to the means previously mentioned, means of displaying visual messages by means of a screen 17 and/or audible messages by a speaker 19, as in the case of a "smartphone" for example. Such a configuration allows the remote server, via its communication means 15 and those 7 of the on-board system 3, to inform the vehicle's user, particularly in real time, of the modification of a speed limit, for example following temporary work or any other event leading the road network management authorities to modify the traffic speed limit $V_L$ on a section of road for an undefined period of time.

What is claimed is:

1. A method of updating a database of traffic speed limits ($V_{mt}$) for vehicles traveling on at least one section ($t_n$) concerned of a road network, including a remote server (1) comprising said speed limits database (10), an average speeds database (11), means (15) of communicating with an on-board system (3) on each vehicle, said on-board system comprising:

map reference means (5) of a GPS type, means (7) of communicating with the remote server (1), means (5) of measuring an instantaneous speed (Vit) of the vehicle, data processing means (8), at least one of the on-board system (3) or the remote server (1) comprising a mapping database (9) of road sections (t), wherein the remote server (1):

communicates with said on board system via the means of communicating with the remote server, constructs, for each road section ($t_n$) a graph where the abscissa is the average speed ($V_{mt}$) of vehicles having traversed said road section ($t_n$) during a specific period of time, and the ordinate is the number of vehicles corresponding to said speeds;

periodically calculates, for said section (tn) concerned, a statistical maximum value (VMt) of average speed values (Vmt) of all vehicles having traversed said section (tn) concerned during a specific period of time and which are stored in the average speeds database (11), wherein the maximum value ($V_{Mt}$) is the maximum value of said graph corresponding to the speed at which most vehicles traveled over said section ($t_n$);

determines a difference (d) between said statistical maximum value (VMt) and a value (VLt) recorded for said section in the speed limits database (10), when the difference (d) is greater than a threshold value, replaces in the speed limits database (10) the value (VLt) recorded for said section with a new value (VL't) based on said statistical maximum value (VMt).

2. The method of updating a speed limits database according to claim 1, wherein the value closest to the statistical maximum value ($V_{Mt}$) contained in a table (TAB) of possible limit values can be taken as a new speed limit value for said section.

3. The method of updating a speed limits database according to claim 1, wherein a new value of the authorized speed limit is displayed in the on-board system.

4. The method of constituting the database of average traffic speeds ($V_{mt}$) for vehicles on at least one section ($t_n$) concerned of the road network for the implementation of the method of updating the speed limits database (10) according to claim 1, said average speeds database (11) being contained in the remote server (1) comprising means of communicating with the on-board system (3) on each vehicle, said on-board system comprising:

map reference means (5) of the GPS type, means (7) of communicating with the remote server (1), means (5) of measuring the instantaneous speed ($V_{it}$) of the vehicle, data processing means (8), at least one of the on-board system (3) or the remote server (1) comprising a mapping database (9) of the road sections (t), wherein the on-board system (3) of the vehicle:

determines, based on its map reference means (5) and on the mapping database (9), the section ($t_n$) concerned on which it is traveling as well as each change of section (t), determines at each change of section (t) the average speed ($V_{mt}$) of the vehicle on the section previously traveled, and communicates said speed to the remote server (1) as well as an identifier ($t_n$) of said section and the direction of travel of the vehicle thereon, and the remote server, upon receipt of said communication, places in the average speeds database (11) the identifier ($t_n$) of the section concerned, said average speed value ($V_{mt}$) on said section, a travel time over said section as well as a direction of travel thereon.

5. The method of constituting a database (11) of average traffic speeds ($V_{mt}$) according to claim 4, wherein, in order to calculate the average speed ($V_{mt}$) of the vehicle, the on-board system (1):

reads, at specific time intervals (p), successive instantaneous positions of the vehicle, stores said instantaneous positions in memory, calculates the length ($L_t$) of the section ($t_n$) concerned, which is equal to a sum of the lengths ($LS_1$, $LS_2$, . . . $Ls_n$) of the segments ($S_1$, $S_2$, . . . $S_n$) separating two readings of successive positions of the section ($t_n$) concerned, calculates the time ($T_t$) traveled on the section ($t_n$) concerned, which is equal to the time separating the first and the last readings on said section ($t_n$), calculates the ratio of the length ($L_t$) of the section divided by the time ($T_t$) traveled thereon.

6. The method of constituting a database of average traffic speeds ($V_{mt}$) according to claim 4, wherein, in order to calculate the average speed ($V_{mt}$) of the vehicle, the on-board system (1):

reads, at specific time intervals (p), the successive instantaneous speeds ($V_{it}$) of the vehicle, stores said instantaneous speeds ($V_{it}$) in memory, calculates the average of said speeds.

* * * * *